United States Patent
Xu et al.

(10) Patent No.: US 11,751,136 B2
(45) Date of Patent: Sep. 5, 2023

(54) POWER OPTIMIZATION METHOD AND DEVICE, SYSTEM, AND USER EQUIPMENT

(71) Applicants: ZTE CORPORATION, Shenzhen (CN); CHANG'AN UNIVERSITY, Shaanxi (CN)

(72) Inventors: Hui Xu, Shenzhen (CN); Chen Lu, Shenzhen (CN); Zijiang Ma, Shenzhen (CN); Zhongwei Ji, Shenzhen (CN); Yimu Hu, Shenzhen (CN); Xiangmo Zhao, Shaanxi (CN); Fei Hui, Shaanxi (CN); Jianfeng Ding, Shenzhen (CN); Xiaoquan Hua, Shenzhen (CN); Yaying Wang, Shenzhen (CN)

(73) Assignees: ZTE CORPORATION, Shenzhen (CN); CHANG'AN UNIVERSITY, Shaanxi (CN)

(*) Notice: Subject to any disclaimer, the term of this patent is extended or adjusted under 35 U.S.C. 154(b) by 11 days.

(21) Appl. No.: 16/955,672

(22) PCT Filed: Dec. 19, 2018

(86) PCT No.: PCT/CN2018/122035
§ 371 (c)(1),
(2) Date: Jun. 18, 2020

(87) PCT Pub. No.: WO2019/120215
PCT Pub. Date: Jun. 27, 2019

(65) Prior Publication Data
US 2020/0413341 A1    Dec. 31, 2020

(30) Foreign Application Priority Data
Dec. 19, 2017   (CN) .......................... 201711376889.3

(51) Int. Cl.
*H04W 52/02* (2009.01)

(52) U.S. Cl.
CPC .............................. *H04W 52/0229* (2013.01)

(58) Field of Classification Search
CPC ........................ H04W 52/0232; Y02D 30/70
See application file for complete search history.

(56) References Cited

U.S. PATENT DOCUMENTS

2006/0194564 A1*   8/2006   Hokimoto ......... H04W 52/0235
                                                  455/343.2
2019/0059129 A1*   2/2019   Luo ................... H04W 52/0216
(Continued)

FOREIGN PATENT DOCUMENTS

| CN | 101820614 A | 9/2010 |
| CN | 103402245 A | 11/2013 |

(Continued)

OTHER PUBLICATIONS

Chinese Office Action for Application No. 201711376889.3, dated Dec. 30, 2020, 16 pages including translation.

(Continued)

*Primary Examiner* — Marcos L Torres
(74) *Attorney, Agent, or Firm* — Morgan, Lewis & Bockius LLP

(57) ABSTRACT

Disclosed is a method for power optimization of a terminal. The method includes that a user equipment (UE) detects an activation signal indicating a control signal to be sent after the activation signal and receives the control signal according to the activation signal. The UE is configured to enter a sleep state in response to determining that the activation signal is not detected or determining that no required control signal exists.

15 Claims, 5 Drawing Sheets

(56) References Cited

U.S. PATENT DOCUMENTS

| | | | |
|---|---|---|---|
| 2020/0163017 A1* | 5/2020 | Priyanto | .............. H04W 88/04 |
| 2020/0304256 A1* | 9/2020 | Park | ..................... H04L 5/0053 |

FOREIGN PATENT DOCUMENTS

| | | |
|---|---|---|
| CN | 103582087 A | 2/2014 |
| CN | 107257257 A | 1/2017 |
| CN | 108235412 A | 6/2018 |
| TW | 201611646 A | 3/2016 |

OTHER PUBLICATIONS

Apple Inc., "Control Indicator in Group-common PDCCH for UE Power Saving", 3GPP TSG-RAN WG1 NR#2, Jun. 27-30, 2017, pp. 1-5, vol. R1-1710907, Qinadao, China.

Samsung, "Paging design," 3GPP TSG RAN WG1 Meeting 90bis, Oct. 9-13, 2017, pp. 1-4, vol. R1-1717580, Prague, CZ.

International Search Report for Application No. PCT/CN2018/ 122035, dated Feb. 25, 2019, 4 pages.

* cited by examiner

POWER OPTIMIZATION METHOD AND DEVICE, SYSTEM, AND USER EQUIPMENT

CROSS REFERENCE TO RELATED APPLICATIONS

This is a national stage application filed under 37 U.S.C. 371 based on International Patent Application No. PCT/CN2018/122035, filed on Dec. 19, 2018, which claims priority to Chinese patent application No. CN201711376889.3 filed with the CNIPA on Dec. 19, 2017, disclosures of which are incorporated herein by reference in their entireties.

TECHNICAL FIELD

The present application relates to the mobile communication technology, for example, to a power optimization method and device, a system, and a user equipment.

BACKGROUND

After decades of development, the cellular mobile communication technology has entered the 4G era. To satisfy predictable higher, faster and newer communication requirements in the future, the industry has begun to carry out research on the 5G technology. At present, 5G technology goals generally recognized in the industry are, by around 2020, to achieve a 1000-fold increase in mobile data traffic per region, a 10- to 100-fold increase in throughput per user, a 10- to 100-fold increase in the number of connected devices, a 10-fold extension in the battery life of a low-power device and a 5-fold decrease in an end-to-end delay.

Common services can be generally divided into three types: enhanced mobile broad band (eMBB), ultra-reliable and low latency communications (URLLC) and massive machine type communications (mMTC). Different services have different requirements for delay, coverage and reliability. For eMBB, a high peak transmission rate is emphasized, the requirements for delay are not high and the requirements for reliability are medium. For URLLC, a low delay and a high reliability are emphasized. For mMTC, large connection density and coverage are emphasized and the requirement for delay is not high. Therefore, eMBB is applicable to transmission on a large bandwidth and the subframes of eMBB are relatively long; URLLC is sporadic, needs to be transmitted and received in a short time and is applicable to transmission on a large bandwidth in a short scheduling time unit (which may be measured in time or in symbols); and mMTC is applicable to transmission on a narrow bandwidth in a relatively long scheduling time unit.

For a battery-powered Internet of Things (IoT)/MTC UE, it is needed to take measures to reduce the power consumption of the UE. For a mains-powered IOT/MTC UE, it is also needed to reduce the power consumption of the UE to achieve the goal of green energy saving. At present, smartphones are gradually popularized. Meanwhile, a large number of applications run on smartphones. These applications may cause the batteries of smartphones to have more power consumption and shorter life spans. Thus, power saving of smartphones is also a key issue that has to be addressed.

During the research and practice of related technologies, it is found that the related technologies have the following problems: both MTC UEs and smartphones have the requirements for power saving, but no solution has been provided to solve the problem of how to optimize the energy saving of a UE in the connected state, the problem of how to reduce the signaling interaction between a UE and a network and the problem of how to compromise between energy saving and a delay.

SUMMARY

In view of this, the present disclosure provides a power optimization method to alleviate the power consumption of a UE.

One embodiment according to the present disclosure discloses a power optimization method. The method includes that a user equipment (UE) detects an activation signal indicating a control signal to be sent after the activation signal, receives the control signal according to the activation signal, and enters the sleep state in response to determining that the activation signal is not detected or determining that no required control signal exists.

Another embodiment according to the present disclosure discloses a power optimization device. The device includes a detection module configured to detect, by a user equipment (UE), an activation signal indicating a control signal to be sent after the activation signal; a receiving module configured to receive the control signal according to the activation signal; and a processing module configured, in response to determining that the detection module does not detect the activation signal or determining that no required control signal exists, to control the UE to enter the sleep state.

Another embodiment according to the present disclosure discloses a power optimization system. The system includes a base station and a user equipment (UE). The base station is configured to send an activation signal and a control signal to the UE, where the activation signal indicates the control signal to be sent after the activation signal. The UE is configured to detect the activation signal, to receive the subsequent control signal according to the activation signal, and to enter the sleep state in response to determining that the activation signal is not detected or determining that the control signal does not exist.

Another embodiment according to the present disclosure discloses a user equipment. The user equipment includes a sending module configured to send activation capability information to a base station; a receiving module configured to receive an activation signal and a control signal sent by the base station, where the activation signal indicates the control signal to be sent after the activation signal; and a processing module configured to operate according to the received activation signal; or configured to control the UE to enter the sleep state in response to a detection module not detecting the activation signal or determining that the control signal does not exist.

DETAILED DESCRIPTION

The abbreviations below are technical terms that may be involved in the description of the present disclosure. These abbreviations are listed here for reference.

AS: Access Stratum
DRX: Discontinuous Reception
DTX: Discontinuous Transmission
NAS: Non-Access Stratum
LTE: Long Term Evolution
MTC: Machine Type Communication
QoS: Quality of Service
GERAN: GSM/EDGE Radio Access Network
GPRS: General Packet Radio Service
UTRAN: Universal Terrestrial Radio Access Network
E-UTRAN: Evolved UTRAN
MME: Mobility Management Entity
SGSN: Serving GPRS Support Node
GGSN: Gateway GPRS Support Node
P-GW: PDN GateWay
PDN: Packet Data Network
S-GW: Serving GateWay
IMSI: Internal Mobile Subscriber Identifier
RRC: Radio Resource Control
O&M: Operation and Maintenance
HSS: Home Subscriber Server
HLR: Home Location Register The solution of the present application is further described below in detail in conjunction with drawings and embodiments. It is to be noted that if not in collision, the embodiments and features therein in the present application may be combined with each other.

An LTE UE has two radio resource control (RRC) states at an access stratum (AS): the idle state RRC_IDLE) and the connected state (RRC_CONNECTED). The UE needs to enter the connected state when sending data and needs to be in the idle state or the connected state when receiving data. Discontinuous reception (DRX) refers to stopping monitoring a Physical Downlink Control Channel (PDCCH) for a period of time. There are two types of DRX. One is idle DRX. As the name implies, when the UE is in idle DRX, since there is no RRC connection and user's proprietary resources when the UE is in the idle state, a paging channel and a broadcast channel are mainly monitored. The purpose of discontinuous reception can be achieved as long as a DRX cycle is defined.

The other is active DRX, that is, DRX in which the UE is in the RRC_CONNECTED state. Resource allocation of the system can be improved. More importantly, the power of a mobile phone can be saved, and it is not needed to achieve this purpose by making the UE enter the RRC_IDLE mode. For example, the mobile phone does not need to constantly monitor downlink data and related processing of some non-real-time applications, such as web browsing and instant messaging during a period of time, so DRX can be applied to this case. Additionally, since RRC connection still exists in this state, the speed at which the UE switches to the active state is very fast. In a current 5G new radio (NR) system, an RRC_INACTIVE state is added. This state is between idle and connected. In this state, broadcast messages and paging messages are received and UE AS context can be saved in a base station.

Figure 1:
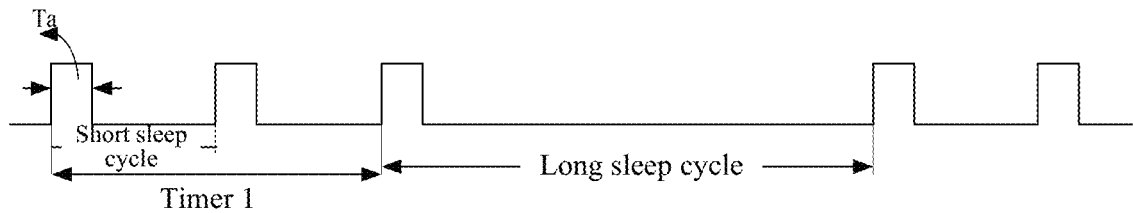
FIG. 1 is a schematic diagram illustrating a long DRX cycle and a short DRX cycle in LTE according to a related art.

In an LTE RRC_CONNECTED DRX mode, there are a short DRX cycle and a long DRX cycle. See FIG. 1. Generally, the short DRX cycle is entered first. When a DRX Short Cycle Timer expires, the long DRX cycle is entered. The longer the DRX cycle is, the longer the UE stays in sleep and thus more energy is saved, but the cost is that if a data packet arrives during the sleep period, a packet transmission and reception delay occurs, affecting the user experience. During a Ta (called on duration) phase, the UE monitors and decodes the PDCCH. If the UE finds a UL/DL grant directed at the UE, the UE further reads the content of a physical downlink shared channel (PDSCH) or sends data. Otherwise, the UE enters the sleep state to save energy. In RRC-IDLE DRX, the UE monitors paging messages in each DRX cycle. If the UE finds a paging message directed at the UE, the UE further receives downlink data. Otherwise, the UE goes to sleep again. Additionally, before an idle UE wakes up from sleep to monitor paging messages, the idle UE generally needs to perform measurement to achieve cell reselection.

Figure 3:
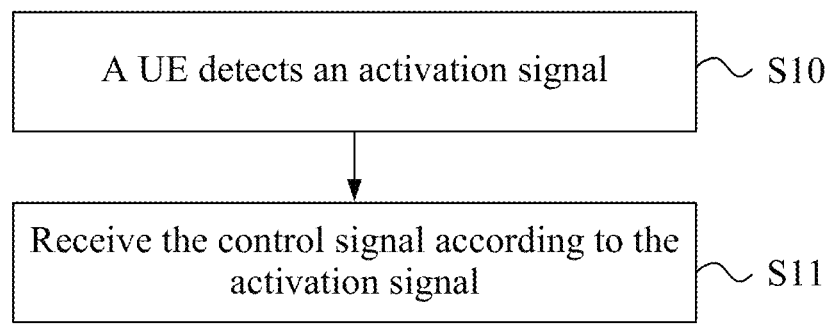
FIG. 3 is a flowchart of a method according to an embodiment of the present application.

In an embodiment according to the present application, a power optimization method is provided. As shown in FIG. 3, the method includes step S10 and step S11.

In step S10, a user equipment (UE) detects an activation signal indicating a control signal to be sent after the activation signal.

In an embodiment, the occurrence time of the control signal includes: for a UE in the connected state, the occurrence time of the control signal being within on duration; or for a UE in the unconnected state, the occurrence time of the control signal being at a paging opportunity (PO).

In an embodiment, the activation signal is repeatedly sendable multiple times as desired in a cycle.

In an embodiment, the activation signal indicating the control signal to be sent after the activation signal includes at least one of an activation signal indicating whether subsequent scheduling information exists; or an activation signal indicating whether a subsequent paging message exists.

In an embodiment, the activation signal includes at least one of a UE group identifier, a UE identifier, or whether a subsequent control message exists.

In an embodiment, the activation signal performs indication by using downlink control information (DCI) or a Zadoff-Chu (ZC) sequence.

In an embodiment, before the UE detects the activation signal, the method includes that the UE monitors the activation signal; the UE receives activation signal configuration indication information sent by a base station; and the UE monitors the activation signal according to the activation signal configuration indication information.

In an embodiment, the activation signal configuration indication information includes the position information of the activation signal. The position information includes a time domain, a frequency domain and a space domain. The space domain is a beam identifier.

In step S11, the control signal is received according to the activation signal.

In response to determining that the activation signal is not detected or determining that no required control signal exists, the UE enters the sleep state.

In an embodiment, before receiving the control signal according to the activation signal, the method further includes determining whether the control signal exists. Determining whether the control signal exists includes determining, by the UE, whether the control signal exists according to the activation signal or the content of the activation signal.

In an embodiment, the activation signal and the control signal occur in the same cycle; or the activation signal and the control signal occur in different cycles.

In an embodiment, the activation signal and the control signal occur in different cycles through the following manner: after the activation signal is detected in a first cycle, the UE enters the sleep state; in a second cycle, the UE receives the control signal.

In an embodiment, the UE detects and receives the activation signal through one of the following manners: the UE detects and receives the activation signal by using a dedicated receiver for the activation signal; or the UE detects and receives the activation signal by using a universal receiver.

In the power optimization method provided in the present application, a base station sends position information of an activation signal to a UE, where the activation signal indicates the presence of subsequent control information and a mapping exists between the activation signal and the UE; the UE detects the activation signal, receives the subsequent control information according to the activation signal; and the UE enters the sleep state in response to determining that no required subsequent control information exists.

Through the present application, the power consumption of the UE can be reduced. When the network load is low, the number of times the UE detects the decoding control information is reduced and the power optimization of the UE is achieved.

Figure 4:
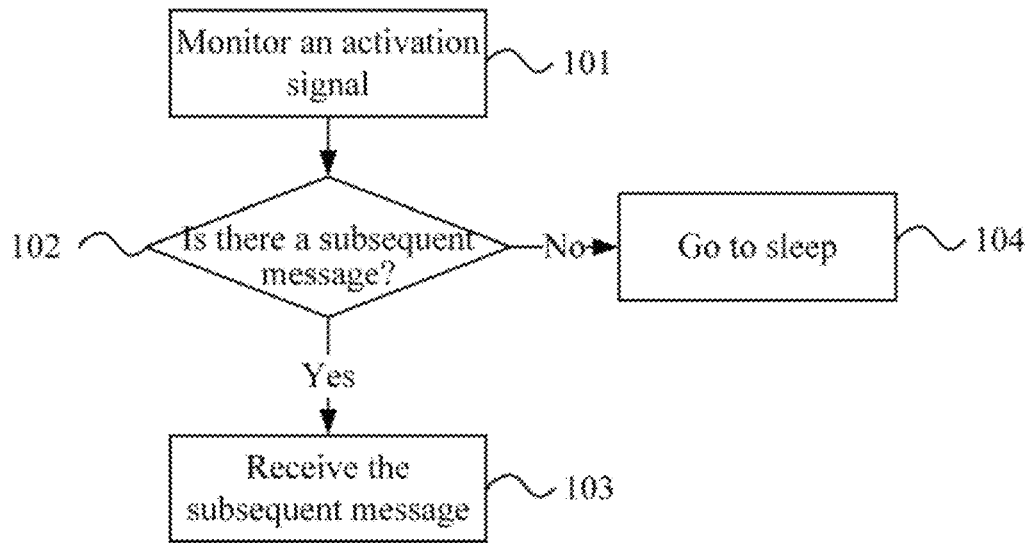
FIG. 4 is another flowchart of a method according to an embodiment of the present application.

In an application embodiment, the power saving method of the present application includes steps 101, 102, 103 and 104. See FIG. 4.

In step 101, a UE monitors an activation signal.

The UE is a UE group. One UE group contains one or more UEs. One UE group corresponds to one group identifier. The UE may be in the connected state RRC_CONNECTED or RRC_INACTIVE or the idle state RRC_IDLE.

For a UE in the connected state RRC_CONNECTED, the activation signal corresponds to subsequent PDCCH information, that is, the activation signal indicates the sending of the subsequent PDCCH information. If there is no activation signal, there is no subsequent PDCCH information. Alternatively, the content of the activation signal indicates whether there is subsequent PDCCH information. The subsequent PDCCH information indicates that there is a downlink or uplink scheduling grant for the UE. The activation signal is downlink control information (DCI) or a dedicated Zadoff-chu (ZC) sequence. The DCI is sent on a downlink control channel. The cyclic redundancy check (CRC) part of the DCI is scrambled by using a corresponding Radio Network Temporary Identity (RNTI). The ZC sequence is obtained by using a predefined ZC sequence cyclic shift. The DCI or ZC sequence may further indicate one or more of a UE group identifier, a UE identifier, or whether a subsequent PDCCH exists.

It is to be noted that PDCCH and PDSCH are used as examples in the present application, and in practice, different terms such as control information and user data can be used.

For a UE in RRC_INACTIVE or the idle state RRC_IDLE, the activation signal corresponds to a subsequent paging message, that is, the activation signal indicates the sending of the subsequent paging message. If there is no activation signal, there is no subsequent paging message. Alternatively, the content of the activation signal indicates whether there is a subsequent paging message. The subsequent paging message indicates that there is a paging message for the UE. The activation signal may be a DCI or ZC sequence. The DCI or ZC sequence may further indicate one or more of a UE group identifier, a UE identifier, or whether a subsequent paging message exists.

Figure 2A:
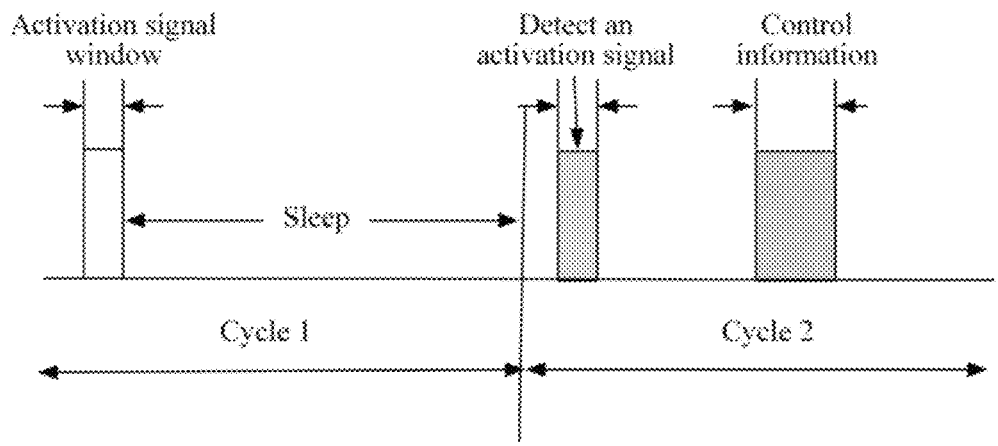
FIG. 2A is a schematic diagram illustrating an activation signal and control information in the same cycle according to an embodiment of the present application.
Figure 2B:
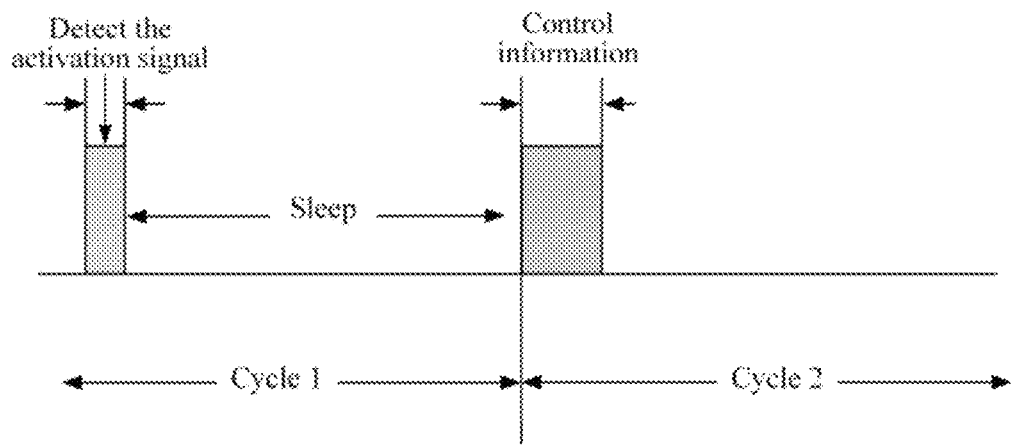
FIG. 2B is a schematic diagram illustrating an activation signal and control information in different cycles according to an embodiment of the present application.

The position of the activation signal is determined by a base station and notified to the UE. The position information includes a time domain, a frequency domain and a space domain. The space domain is directed at a multi-beam system, that is, indicates the corresponding beam identifier. For a schematic diagram illustrating the positions of the activation signal and the corresponding control information, see FIGS. 2A and 2B. FIG. 2A indicates that the activation signal and the control information are in the same cycle. FIG. 2B indicates that the activation signal and the control information are in different cycles.

To show that the UE supports the activation signal, the capability information sent by the UE to the base station indicates that the UE can receive the activation signal. The activation signal is repeatedly sendable multiple times as desired in a cycle. If the base station wants to increase the coverage, that is, to allow more UEs to receive the activation signal, the base station may send the activation signal multiple times in a cycle.

The activation signal may be sent periodically or on demand. Periodic sending means that the activation signal is sent in each cycle. On-demand sending means that the activation signal is sent only when there is a subsequent PDCCH or paging message. The activation signal may be sent one or more times. Power consumed in the detection of the activation signal is low. The UE wakes up to perform detection when the activation signal is sent.

The UE includes an IOT/MTC UE, an intelligent terminal or a vehicle-mounted terminal. The IOT/MTC UE refers to a UE with the IOT/MTC function. The intelligent terminal includes a smart phone, a tablet PC, a network card or a netbook. The vehicle-mounted terminal refers to a terminal with the Internet of Vehicles function.

In step 102, the UE determines whether there is a subsequent message. If there is a subsequent message, step 103 is performed; otherwise, step 104 is performed.

The UE determines whether there is a subsequent message according to the activation signal or the content of the activation signal. The UE determines whether there is a subsequent message according to the activation signal through the following manner: if the UE detects the activation signal, there is a subsequent message; otherwise, there is no subsequent message. The UE determines whether there is a subsequent message according to the content of the activation signal through the following manner: the UE detects the activation signal, reads the content of the activation signal, and determines whether there is a subsequent message according to the read content.

The occurrence time of the subsequent message refers to time within on duration for a UE in the connected state and refers to a paging opportunity (PO) for a UE in the unconnected state.

The UE detects and receives the activation signal through two manners. (1) The first manner is to use a dedicated receiver. The UE uses a dedicated receiver to detect the activation signal, for example, perform related operations during the detection of the activation signal. If the UE determines that there is a subsequent message according to the activation signal, the UE further activates the receiving unit and the modem of the UE for receiving the subsequent message. Since the receiving unit needs to be started after the activation signal is detected, the delay is large. Thus, the first manner is not applicable to a delay-sensitive service. (2) The second manner is to use a related universal receiving unit and a related universal modem. In the second manner, there is no additional processing delay.

It is to be noted that the activation signal may correspond to a UE group. For example, the activation signal is scrambled by a UE group ID, the activation signal corresponds to a specific UE group ID, or the content of the activation signal includes a UE group ID. Thus, when a UE in the UE group detects the activation signal, the UE cannot determine whether there is a required subsequent message. The UE can determine whether there is a required subsequent message only after the subsequent message is received. The required subsequent message refers to a message corresponding to the UE. For example, the subsequent message contains a UE identifier.

In step 103, the UE receives the subsequent message and operates according to the subsequent message.

The UE determines that there is a subsequent message and receives the subsequent message. If the subsequent message is directed at the UE, for example, the PDCCH is scrambled by a Cell-RNTI (C-RNTI) of the UE, then the UE further obtains the content of a PDSCH according to the content of the PDCCH or performs uplink transmission. Alternatively, if the paging message contains the UE identifier, the UE further establishes an RRC connection with the network and receives the required data from the network through the RRC connection; otherwise (the subsequent message is not related to the UE), the UE goes to sleep.

In step 104, the UE goes to sleep.

If the UE determines that there is no corresponding subsequent message, the UE goes to sleep and waits until the next cycle when the UE wakes up again to monitor the activation signal.

The solution of the present application is further described through the application embodiments below.

Embodiment One

Figure 5:
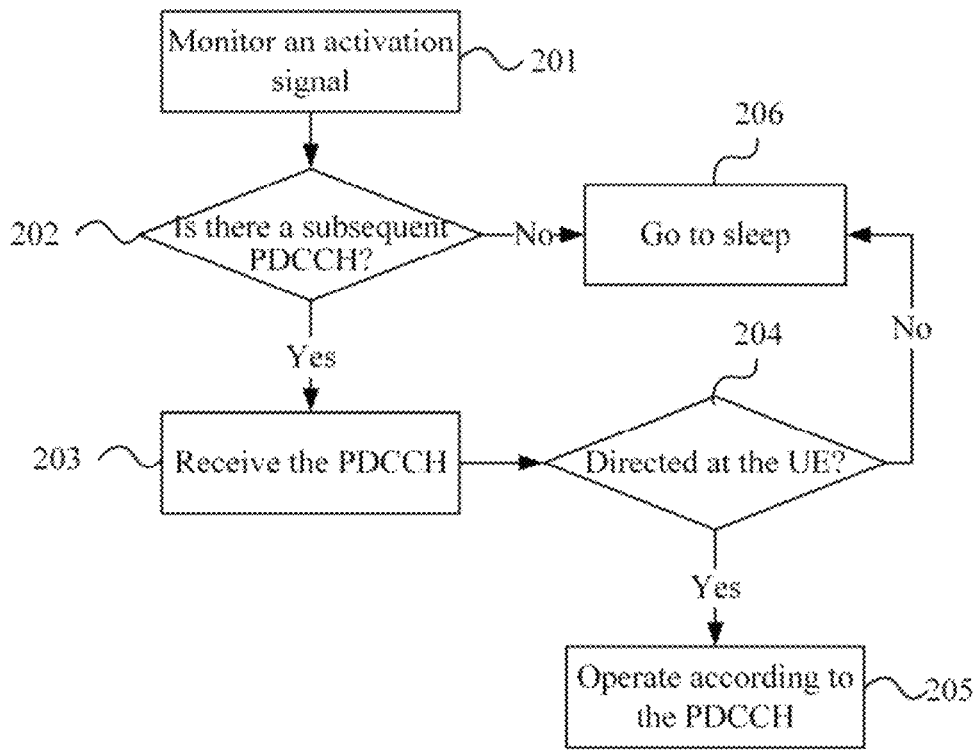
FIG. 5 is a flowchart according to embodiment one of the present application.

For a scenario where a UE in the connected state monitors an activation signal, the power optimization method includes steps 201 to 206. See FIG. 5.

In step 201, the UE monitors the activation signal.

The UE may be any one of an MTC/IOT UE or an intelligent terminal.

Before monitoring the activation signal, the UE needs to receive activation signal configuration indication information sent by a base station, that is, the UE first acquires the position information of the activation signal and then monitors the activation signal according to the position information.

The activation signal may be sent before on duration or at on duration. For the sake of a reduction in power consumption, the duration of the activation signal is shorter than on duration. If the activation signal is sent before on duration, the base station needs to consider the processing time between the reception of the activation signal by the UE and the reception of PDCCH information by the UE to determine the transmission time of the activation signal. If the activation signal is sent at on duration, the UE receives the PDCCH information at on duration in the next cycle.

The activation signal may be a DCI or ZC sequence for indication. The ZC sequence may indicate a specific UE group ID, that is, the corresponding UE group may be determined according to a detected activation signal sequence. For example, a root sequence is used for cyclic shift to obtain different ZC sequences for indicating different UE groups. This ensures orthogonality between the different ZC sequences, thereby improving the accuracy of activation signal detection. If the activation signal is indicated by DCI, the CRC of the DCI is scrambled using the (trigger) T-RNTI corresponding to the activation signal. The RNTI may be used for indicating a UE group. For example, different T-RNTIs correspond to different UE groups. In an embodiment, bits in the DCI may indicate additional information, for example, indicate the specific UE corresponding to a subsequent PDCCH. In this embodiment, assuming that one UE group contains 8 UEs, then an 8-bit bitmap in the DCI is used to perform indication, and the UE may be notified of the position of the activation signal according to UE ID signaling (for example, IMSI or C-RNTI). The digital order of the UE ID signaling may be mapped onto eight bits from left to right. The corresponding bit 1 indicates that the subsequent PDCCH is directed at the corresponding UE.

There are two schemes for sending the activation signal: (1) the activation signal is sent periodically, that is, the activation signal is sent in each cycle, and as regards whether a subsequent PDCCH exists, different activation signals are sent, such as different ZC sequences or different DCI; (2) the activation signal is sent on demand, that is, the activation signal is sent only if a subsequent PDCCH exists and is not sent if no subsequent PDCCH exists.

The base station (gNB or eNB) notifies the UE of the position of the activation signal according to the RRC signaling. The frequency domain position of the activation signal may be located in a common search space or a specific search space of a UE group. The activation signal may occupy a length of one or more subframes as desired and may be sent one or more times within the time window of the activation signal. The time window of the activation signal is a possible sending position of the activation signal. If the activation signal needs to be repeated multiple times, the base station notifies the UE of the number of times the activation signal is repeatedly sent.

In step 202, the UE determines whether there is a subsequent PDCCH. If there is a subsequent PDCCH, step 203 is performed; otherwise, step 206 is performed.

The UE determines whether there is a subsequent PDCCH according to the activation signal. The PDCCH refers to the PDCCH required by a UE and may be the PDCCH required by a certain UE in a UE group. If the activation signal is directed at one UE group, each UE in the UE group continues to detect the content of a subsequent PDCCH to determine whether the subsequent PDCCH is required by the each UE. The subsequent PDCCH is sent in the on duration time window.

In step 203, the UE detects the PDCCH.

The UE detects the PDCCH by, for example, performing blind detection in a search space by using a C-RNTI.

In step 204, the UE determines whether there is a subsequent PDCCH directed at the UE. If there is a subsequent PDCCH directed at the UE, step 205 is performed; otherwise, step 206 is performed.

If a PDCCH corresponding to the UE is detected, the UE further reads the content of the PDCCH; otherwise, the UE goes to sleep.

In step 205, the UE operates according to the indication content of the PDCCH.

The UE detects a required PDCCH, reads the content of the PDCCH, and, according to the content of the PDCCH, further reads the content of a PDSCH or sends uplink data.

In step 206, the UE goes to sleep.

If the UE detects no required PDCCH, the UE goes to sleep until the next activation signal moment.

Embodiment Two

Figure 6:
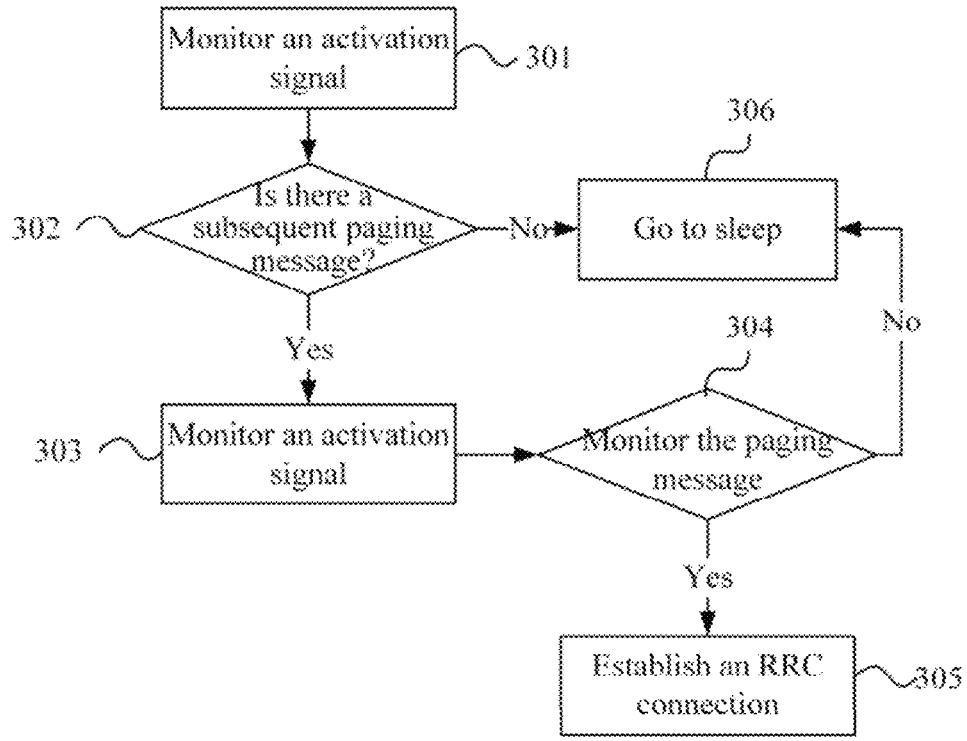
FIG. 6 is a flowchart according to embodiment two of the present application.

For a scenario where a UE in the unconnected state monitors an activation signal, the power optimization method includes steps 301 to 306. See FIG. 6.

In step 301, the UE monitors the activation signal.

The UE monitors the activation signal within the transmission time of the activation signal. The UE monitors the activation signal through one of two manners: (1) the UE has a dedicated activation signal detection module, and the preceding module is enabled for detection, for example, performs a relevant operation by using a known ZC sequence or performs an XOR operation by using T-RNTI; or (2) the UE uses a relevant receiving module to perform detection.

In step 302, the UE determines whether there is a subsequent paging message. If there is a subsequent paging message, step 303 is performed; otherwise, step 306 is performed.

The UE determines whether there is a subsequent paging message according to the activation signal. The subsequent paging message is sent at a paging moment (PO). After detecting the activation signal, multiple UEs in the same UE group continue monitoring the paging message. If the UE determines that there is no subsequent paging message, the UE goes to sleep.

In step 303, the UE monitors the paging message.

The UE monitors the paging message at the paging moment, that is, detects a P-RNTI. If the P-RNTI is detected, the UE reads the content in the PDCCH.

Since the UE may move during sleep, after waking up, the UE needs resynchronization to correct the time and frequency. The UE may perform the resynchronization by using a relevant synchronization signal, by redesigning a new synchronization signal, or by using the activation signal as a synchronization signal. The UE performs further measurement after synchronization, including the measurement of the quality of the reference signals of the local cell and neighbor cells, to evaluate whether to perform cell reselection. For a low-speed mobile or stationary UE, a base station may configure multiple (n) cycles and notify the number (n) of the multiple cycles to the UE. The UE wakes up at a corresponding time to perform synchronization and measurement.

In step 304, the UE determines whether there is a required paging message. If there is a required paging message, step 305 is performed; otherwise, step 306 is performed.

The UE reads a paging message in a PDSCH according to the content of the PDCCH, and determines whether there is a UE ID in the paging message. If there is a UE ID in the paging message, there is data targeted for the UE; otherwise, there is no data targeted for the UE.

In step 305, the UE establishes an RRC connection and receives data.

The UE establishes an RRC connection with the base station to receive data.

In step 306, the UE goes to sleep.

The UE sleeps until the activation signal moment in the next cycle when the UE wakes up.

Embodiment Three

Figure 7:
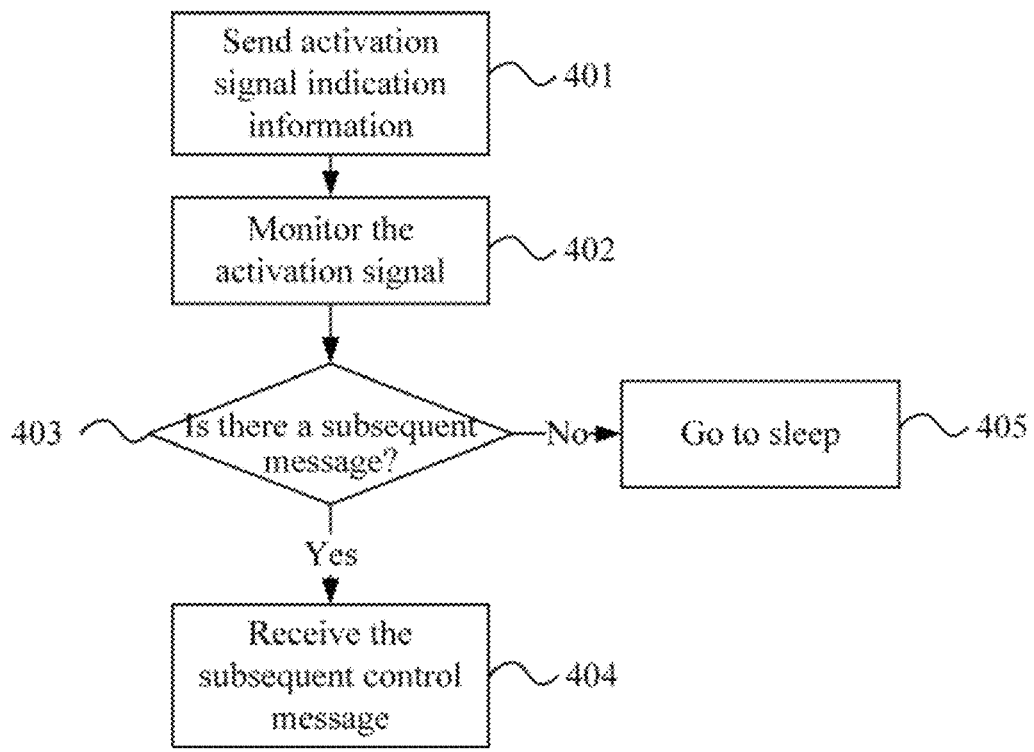
FIG. 7 is a flowchart according to embodiment three of the present application.

For a scenario where an activation signal is sent periodically, the power saving method includes steps 401 to 405. See FIG. 7.

In step 401, a base station sends activation signal indication information to a UE.

The indication information is carried by RRC signaling, such as a broadcast message or dedicated RRC signaling. The indication information includes one of the following: the ZC sequence index of the activation signal, the T-RNTI corresponding to the activation signal, the time domain position of the activation signal, the length of the activation signal, the number of repetitions of the activation signal, or the method of sending the activation signal. The method of sending the activation signal refers to periodic sending.

In step 402, the UE monitors the activation signal according to the indication information.

The UE periodically monitors the activation signal at the corresponding time domain position according to the indication information. Since the activation signal is sent periodically, different signals are sent for the presence or absence of a subsequent message. For example, different ZC sequences are used to indicate the presence or absence of a subsequent message, or different T-RNTIs or different DCI contents are used to indicate the presence or absence of a subsequent message. Meanwhile, different ZC sequences or different T-RNTIs may correspond to different UE groups. The specific correspondence is also described in the indication information of step 401.

The specific signal format is described in the indication information sent by the base station in step 401.

In step 403, the UE determines whether there is a subsequent message. If there is a subsequent message, step 404 is performed; otherwise, step 405 is performed.

The UE monitors the activation signal and determines whether there is a subsequent message according to different activation signals.

In step 404, the UE receives the subsequent message and operates according to the subsequent message.

In response to determining that there is a subsequent message, the UE receives the subsequent message, such as a PDCCH or a paging message, and the UE further operates according to the content of the PDCCH or the content of the paging message, for example, the UE further receive a PDSCH or establish an RRC connection.

In step 405, the UE goes to sleep.

In response to determining that there is no subsequent message, the UE sleeps until the activation signal moment in the next cycle when the UE wakes up and continues monitoring the activation signal.

Embodiment Four

Figure 8:
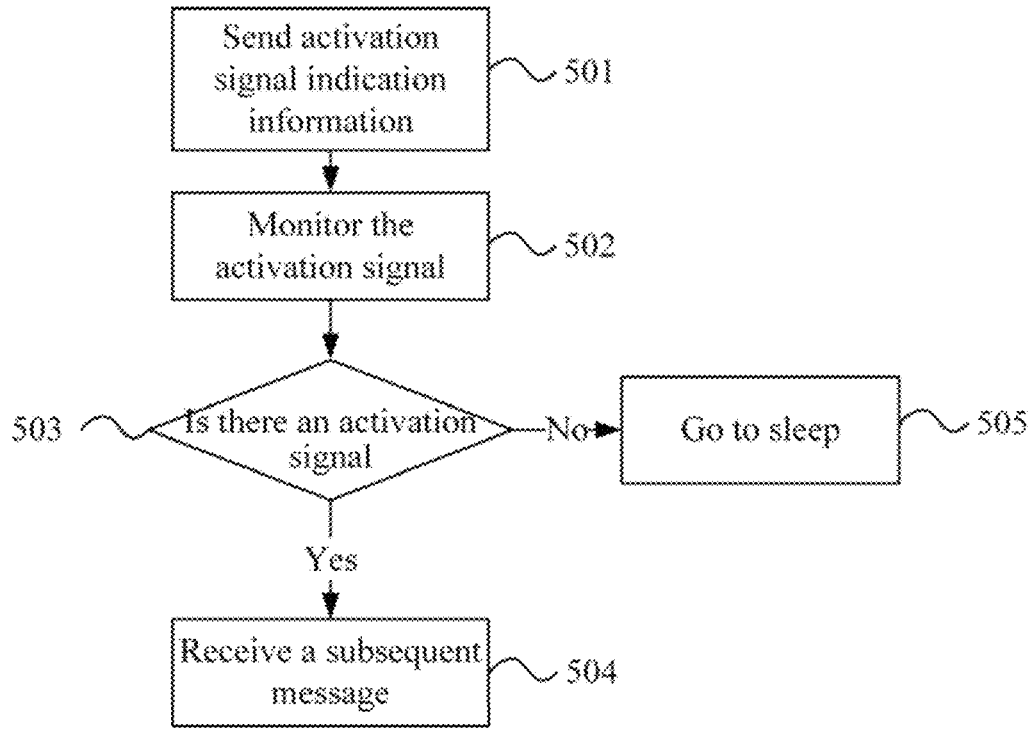
FIG. 8 is a flowchart according to embodiment four of the present application.

For a scenario where an activation signal is sent on demand, the power saving method includes steps 501 to 505. See FIG. 8.

In step 501, a base station sends an activation signal indication message to a UE.

In step 502, the UE monitors the activation signal according to the indication message.

The activation signal is sent on demand, that is, sent only when there is a subsequent message; but the UE needs to monitor whether there is an activation signal at the activation signal moment in each cycle. Since the activation signal is sent on demand, different ZC sequences or different T-RNTIs correspond to different UE groups. The specific correspondence is described in the indication message of step 501.

In step 503, the UE determines whether an activation signal is detected. If an activation signal is detected, step 504 is performed; otherwise, step 505 is performed.

If an activation signal is detected, there is a subsequent message; otherwise, there is no subsequent message.

In step 504, the UE continues to receive a subsequent message.

In step 505, the UE goes to sleep.

Figure 9:
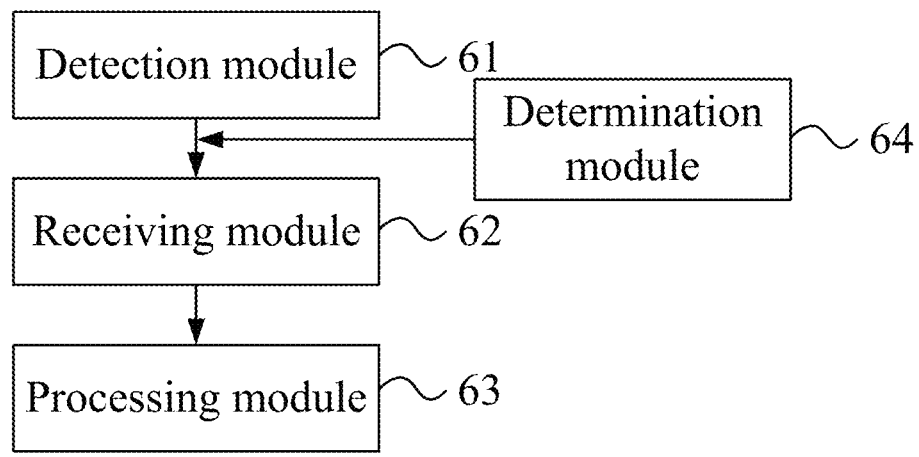
FIG. 9 is a structural diagram of a device according to an embodiment of the present application.

An embodiment of the present disclosure further provides a power optimization device. As shown in FIG. 9, the device includes a detection module 61, a receiving module 62 and a processing module 63.

The detection module 61 is configured to detect, by a UE, an activation signal indicating a control signal to be sent after the activation signal. The receiving module 62 is configured to receive the control signal according to the activation signal. The processing module 63 is configured, in response to determining that the detection module does not detect the activation signal or determining that no required control signal exists, to control the UE to enter the sleep state.

In an embodiment, the device further includes a determination module 64. The determination module 64 is configured, before the receiving module 62 receives the control signal according to the activation signal, to determine whether the control signal exists. Determining whether the control signal exists includes determining according to the activation signal or content of the activation signal.

In an embodiment, the occurrence time of the control signal includes: for a UE in the connected state, the occurrence time of the control signal being within on duration; or for a UE in the unconnected state, the occurrence time of the control signal being at a paging opportunity (PO).

In an embodiment, the activation signal is repeatedly sendable multiple times as desired in a cycle.

In an embodiment, the activation signal indicating the control signal to be sent after the activation signal includes at least one of an activation signal indicating whether subsequent scheduling information exists; or an activation signal indicating whether a subsequent paging message exists.

In an embodiment, the activation signal includes at least one of a UE group identifier, a UE identifier, or whether a subsequent control message exists.

In an embodiment, the activation signal performs indication by using downlink control information (DCI) or a Zadoff-Chu (ZC) sequence.

In an embodiment, the activation signal and the control signal occur in the same cycle; or the activation signal and the control signal occur in different cycles.

In an embodiment, the activation signal and the control signal occur in different cycles through the following manner: after the activation signal is detected in a first cycle, the UE enters the sleep state; in a second cycle, the UE receives the control signal.

In an embodiment, before the detection module detects the activation signal, the detection module is further configured to monitor the activation signal; to receive activation signal configuration indication information sent by a base station; and to monitor the activation signal according to the activation signal configuration indication information.

In an embodiment, the activation signal configuration indication information includes the position information of the activation signal. The position information includes a time domain, a frequency domain and a space domain. The space domain is a beam identifier.

Figure 10:
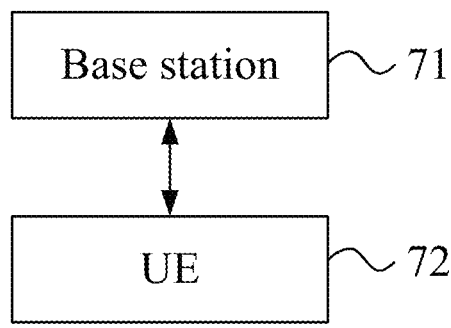
FIG. 10 is a structural diagram of a power optimization system according to an embodiment of the present application.

The present application further provides a power optimization system. As shown in FIG. 10, the system includes a base station 71 and a user equipment (UE) 72.

The base station 71 is configured to send activation signal indication information and a subsequent message to the UE 72 and receive the activation signal capability information of the UE 72.

The UE 72 is configured to send the activation capability indication information to the base station 71 and receive the activation signal indication information and the subsequent message of the base station.

The base station includes at least one of an eNB or a gNB.

The UE 72 is further configured to operate according to the received indication information sent by the base station 71. The UE includes any one of an MTC UE or an intelligent terminal.

Figure 11:
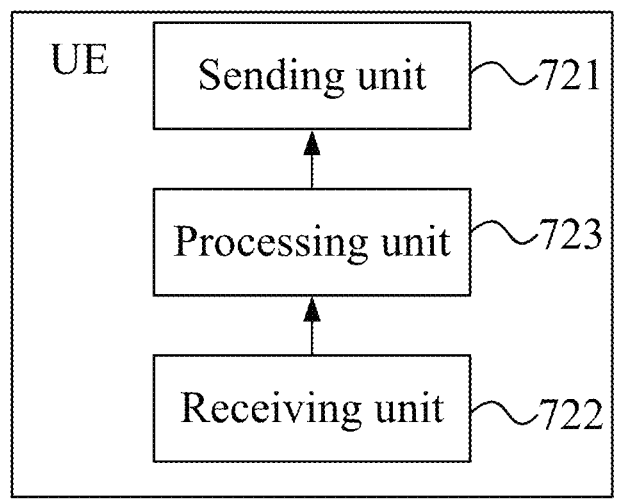
FIG. 11 is a structural diagram of a user equipment according to an embodiment of the present application.

The present application further provides a UE. As shown in FIG. 11, the UE includes a sending unit 721, a receiving unit 722 and a processing unit 723.

The sending unit 721 is configured to send activation capability information to a base station.

The receiving unit 722 is configured to receive activation indication information and subsequent information sent by the base station.

The processing unit 723 is configured to operate according to the received activation information.

An embodiment according to the present application further provides a storage medium. In this embodiment, the storage medium may be configured to store program codes for executing steps S1 and S2 described below.

In step S1, a UE detects an activation signal indicating a control signal to be sent after the activation signal.

In step S2, the UE receives the control signal according to the activation signal. In response to determining that the activation signal is not detected or determining that no required control signal exists, the UE enters the sleep state.

In an embodiment, the storage medium may include, but is not limited to, a USB flash disk, a read-only memory (ROM), a random-access memory (RAM), a mobile hard disk, a magnetic disk, an optical disk or another medium capable of storing program codes.

Apparently, it is to be understood by those skilled in the art that the modules or steps of the present application may be implemented by at least one generic computing device and may be concentrated on a single computing device or distributed in a network formed by multiple computing devices. Optionally, these modules or steps may be implemented by program codes executable by the at least one computing device. Thus, these modules or steps may be stored in a storage medium and executed by the at least one computing device. Moreover, in some cases, the illustrated or described steps may be executed in a sequence different from the sequence described herein. Alternatively, each of these modules or steps may be implemented by being made into an integrated circuit module or multiple ones of these modules or steps may be implemented by being made into a single integrated circuit module. Through this manner, the present application is not limited to any specific combination of hardware and software.

What is claimed is:

1. A power optimization method, comprising:
receiving, by a user equipment (UE) in a radio resource control (RRC) connected state, activation signal configuration indication information from a base station and detecting an activation signal according to the activation signal configuration indication information;
in response to determining that the activation signal is detected, receiving the control signal according to the detected activation signal, wherein the activation signal is used to indicates a control signal to be sent after the activation signal, performs indication through downlink control information (DCI), and be received before on duration in an active Discontinuous Reception (DRX) cycle and wherein occurrence time of the control signal is within the on duration in the active DRX cycle and the activation signal and the control signal occur in different active DRX cycles; and
in response to determining that the activation signal is not detected- or the activation signal is detected but no control signal exists, the UE in the RRC connected state entering a sleep state;
wherein cyclic redundancy check (CRC) of the DCI is scrambled by using a corresponding Radio Network Temporary Identity (RNTI), and the control signal is Physical Downlink Control Channel (PDCCH) information.

2. The method of claim 1, before receiving the control signal according to the activation signal, further comprising determining whether the control signal exists, wherein determining whether the control signal exists comprises:
determining, by the UE in the RRC connected state, whether the control signal exists according to the activation signal or content of the activation signal.

3. A non-transitory computer-readable storage medium storing a computer program, wherein the power optimization method of claim 1 is performed when the computer program is executed by a processor.

4. The method of claim 1, wherein the activation signal is repeatedly sendable multiple times as desired in the active DRX cycle.

5. The method of claim 1, wherein the activation signal is used to indicate the control signal to be sent after the activation signal by using at least one of:
an activation signal is used to indicate whether subsequent scheduling information exists; or
an activation signal is used to indicat whether a subsequent paging message exists.

6. The method of claim 1, wherein the activation signal comprises at least one of a UE group identifier, a UE identifier, or whether a subsequent control message exists.

7. The method of claim 1, wherein the activation signal and the control signal occur in the different active DRX cycles through the following manner:
after the activation signal is detected in a first active DRX cycle, the UE in the RRC_connected state enters the sleep state; in a second active DRX cycle, the UE in the RRC_connected state receives the control signal.

8. The method of claim 1, wherein the activation signal configuration indication information comprises position information of the activation signal, wherein the position information comprises a time domain, a frequency domain and a space domain, wherein the space domain is a beam identifier.

9. The method of claim 1, wherein the UE in the RRC_connected state detects and receives the activation signal through one of the following manners:
the UE in the RRC connected state detects and receives the activation signal by using a dedicated receiver for the activation signal; or
the UE in the RRC connected state detects and receives the activation signal by using a universal receiver.

10. A power optimization device, comprising a processor and a memory for storing execution instructions that when executed by the processor cause the processor to perform steps in following modules:
a detection module, which is configured in a user equipment (UE) in a radio resource control (RRC) CONNECTED state and to receive activation signal configuration indication information from a base station and detect an activation signal according to the activation signal configuration indication information;
detect an activation signal which indicates a control signal to be sent after the activation signal, performs indication by using downlink control information (DCI), and is received before on duration in an active Discontinuous Reception (DRX) cycle;
a receiving module, which is configured to, in response to determining that the activation signal is detected, receive the control signal according to the detected activation signal, wherein the activation signal is used to indicate a control signal to be sent after the activation signal, perform indication through downlink control information (DCI), and be received before on duration in an active Discontinuous Reception (DRX) cycle, and wherein occurrence time of the control signal is within the on duration in the active DRX cycle and the activation signal and the control signal occur in different active DRX cycles; and
a processing module, which is configured, in response to determining that the detection module does not detect the activation signal or in response to determining that the activation signal is detected but no required control signal exists, to control the UE in the RRC connected state to enter a sleep state;
wherein cyclic redundancy check (CRC) of the DCI is scrambled by using a corresponding Radio Network Temporary Identity (RNTI), and the control signal is Physical Downlink Control Channel (PDCCH) information.

11. The device of claim 10, further comprising:
a determination module, which is configured, before the receiving module receives the control signal according to the activation signal, to determine whether the control signal exists, wherein determining whether the control signal exists comprises determining according to the activation signal or content of the activation signal.

12. The device of claim 10, wherein the activation signal is repeatedly sendable multiple times as desired in the active DRX cycle.

13. The device of claim 10, wherein the activation signal is used to indicate the control signal to be sent after the activation signal by using at least one of:
an activation signal is used to indicate whether subsequent scheduling information exists; or
an activation signal is used to indicate whether a subsequent paging message exists.

14. The device of claim 10, wherein the activation signal comprises at least one of a UE group identifier, a UE identifier, or whether a subsequent control message exists.

15. A user equipment in a radio resource control (RRC) _connected state, comprising a processor and a memory for storing execution instructions that when executed by the processor cause the processor to perform steps in following modules:
  a sending module, which is configured to send activation capability information to a base station;
  a receiving module, which is configured to receive activation signal configuration indication information from the base station and detecting an activation signal according to the activation signal configuration indication information; in response to determining that the activation signal is detected, receiving the control signal according to the detected activation signal, wherein the activation signal is used to indicates the control signal to be sent after the activation signal, performs indication through downlink control information (DCI), and be received before on duration in an active Discontinuous Reception (DRX) cycle, and wherein the control signal is Physical Downlink Control Channel (PDCCH) information, occurrence time of the control signal is within the on duration in the active DRX cycle, and the activation signal and the control signal occur in different active DRX cycles; and
  a processing module, which is configured to operate according to the detected activation signal; or configured to control the UE in the RRC connected state to enter a sleep state in response to determining that the activation signal is not detected or the activation signal is detected but no control signal exists;
  wherein cyclic redundancy check (CRC) of the DCI is scrambled by using a corresponding Radio Network Temporary Identity (RNTI).

* * * * *